(12) United States Patent
Gindin (10) Patent No.: US 11,198,399 B2
(45) Date of Patent: Dec. 14, 2021

(54) PERSONAL VEHICLE VISUAL MONITORING CONTROLLER

(71) Applicant: Jeffrey L Gindin, Bellevue, WA (US)

(72) Inventor: Jeffrey L Gindin, Bellevue, WA (US)

(*) Notice: Subject to any disclaimer, the term of this patent is extended or adjusted under 35 U.S.C. 154(b) by 0 days.

(21) Appl. No.: 16/583,083

(22) Filed: Sep. 25, 2019

(65) Prior Publication Data

US 2021/0086705 A1    Mar. 25, 2021

(51) Int. Cl.
*B60R 11/04* (2006.01)
*B62J 99/00* (2020.01)
*H04N 7/18* (2006.01)
*B62J 50/21* (2020.01)

(52) U.S. Cl.
CPC .............. *B60R 11/04* (2013.01); *B62J 99/00* (2013.01); *H04N 7/183* (2013.01); *B60R 2300/802* (2013.01); *B60Y 2200/13* (2013.01); *B62J 50/225* (2020.02)

(58) Field of Classification Search
CPC ......... B60R 11/04; B62J 99/00; B62J 50/225; H04N 7/183
USPC .......................................................... 348/158
See application file for complete search history.

(56) References Cited

U.S. PATENT DOCUMENTS

| 2015/0228066 A1* | 8/2015 | Farb | H04N 5/232941 |
| | | | 348/148 |
| 2016/0101734 A1* | 4/2016 | Baek | B60R 11/04 |
| | | | 348/148 |
| 2017/0293297 A1* | 10/2017 | Kim | B64D 43/00 |

FOREIGN PATENT DOCUMENTS

CN            109466449    *    3/2019    ............... B60R 1/00

OTHER PUBLICATIONS

Cn109466449 Machine Translation (Year: 2019).*

* cited by examiner

*Primary Examiner* — Nguyen T Truong
(74) *Attorney, Agent, or Firm* — Arjomand Law Group; Farjam Majd (57) ABSTRACT

A personal vehicle monitoring system is disclosed including a video camera coupled with a personal vehicle to show a view not in a direct field of view of a rider of the personal vehicle, and a display unit coupled with the personal vehicle and in communication with the video camera to display images captured by the video camera, wherein the display unit includes circuits and software to indicate various events such as other vehicles approaching the personal vehicle. The display unit includes a display device coupled with a display controller. The video camera communicates with the display controller via a video camera controller.

20 Claims, 8 Drawing Sheets

PERSONAL VEHICLE VISUAL MONITORING CONTROLLER

TECHNICAL FIELD

This application relates generally to bicycles and motorcycles. More specifically, this application relates to a method and apparatus for safe riding using a camera-equipped bicycles or helmets.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references riding a bicycle, it will be appreciated that the disclosure may be used with any kind of personal vehicle including a motorcycle, a skateboard, a Segway™ standing transport, and the like.

Briefly described, a method and a system are disclosed to allow viewing of scenes not directly in the field of view of a rider of a personal vehicle. The personal vehicle may be any motorized or unmotorized device that is generally designed for one person (although some personal vehicles, like large motorcycles or multi-seat bicycles may carry multiple riders), usually has two wheels, and usually does not have a reverse motion gear. Examples of personal vehicles include bicycle, a motorcycle, a skateboard, a Segway™ transport, and the like. In various embodiments, the personal vehicle is equipped with a video camera, facing in a direction other than the direction of view of the rider, and a display device facing the rider to display the images captured by the video camera.

In some embodiments, the video camera transmits data wirelessly and the direction of its view is adjustable. In some embodiments, a storage device is used to record the images and/or sounds captured by the video camera for future download to another recording medium or a computing device. The storage device may record scenes for a limited period of time, such as 10 minutes or 20 minutes, and then loop back to the beginning of the storage medium of the storage device and overwrite the previous recording. The storage device may be a hard drive or a solid-state drive (SSD), or other type of storage device, such as battery-backed memory device. The video camera may include a video camera control unit to control the operation of the video camera, and the display unit may include a display control unit to control the operation of the display device. In some embodiments, the motion and recording direction of the video camera is automatically determined based on the turning motion of the bicycle handle.

People are becoming increasingly health and environment conscious, especially in the industrial nations. Additionally, with the gas prices increasing and traffic congestions worsening in large urban areas, people are encouraged to use their cars less and depend more on efficient public transportation, walk, or use bicycles, motorcycles, or other personal vehicles like motorized skateboards. Some people also use motorcycles or scooters for space and energy efficiency. As such, people on foot, riding bicycles, or motorcycles are increasingly sharing the roadways with faster moving automobiles and trucks, increasing the chances of debilitating or fatal accidents. To address these and other safety concerns, it is desirable to provide better visibility to the roadways and environments in which a rider or walker commutes.

A personal vehicle monitoring system is disclosed including a video camera coupled with a personal vehicle to show a view not in a direct field of view of a rider of the personal vehicle, and a display unit coupled with the personal vehicle and in communication with the video camera to display images captured by the video camera, wherein the display unit includes circuits and software to indicate various events such as other vehicles approaching the personal vehicle. The display unit includes a display device coupled with a display controller. The video camera communicates with the display controller via a video camera controller.

Also, a method of viewing a roadway by a rider of the personal vehicle is disclosed including capturing images not directly in a field of view of the rider using a video camera coupled with the personal vehicle, and viewing the images captured by the video camera on a display unit coupled with the personal vehicle and in view of the rider. The display unit may include circuits and software to indicate an event including other vehicles approaching the personal vehicle.

A display unit of a personal vehicle monitoring system is disclosed. The display unit includes a display device to show images to a rider of a personal vehicle and a display controller in communication with the display device to present information to the rider and collect input from the rider via the display device. The display device includes a command and status segment that shows status of a surrounding of the personal vehicle via indicators, the status including a speed of approach of another vehicle and the direction of approach.

Figure 1:
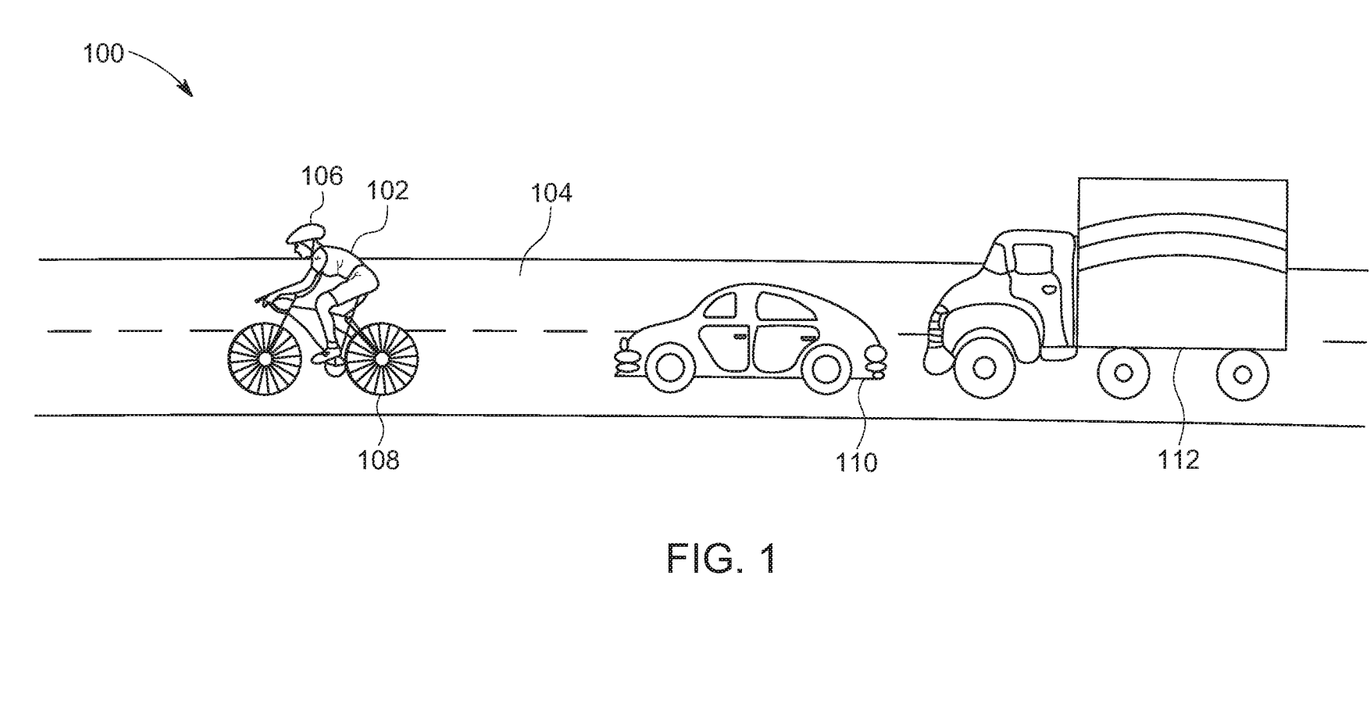
FIG. 1 shows an example operating environment including a bicycle in a traffic scene where the present disclosure may be practiced.

FIG. 1 shows an example operating environment including a bicycle in a traffic scene where the present disclosure may be practiced. Typically, traffic environment 100 may include bicycle rider 102 riding on roadway 104 wearing helmet 106 on bicycle 106. Rider 102 may share the roadway with other traffic such as car 110 and truck 112.

Rider 102 typically has limited view of other traffic moving behind his bicycle 108, usually using a rear-view mirror. Rear view mirrors may offer limited visibility because of getting dirty, fogged up, and the like. Additionally, to look at a rear view mirror, the rider has to look down at the mirror and take his eyes off the road, reducing safety. Furthermore, rear view mirrors only show what is directly behind the bicycle, not what may be to the sides of the bicycle and not what is behind the rider's current field of view. For example, if the rider looks to the left of his bicycle, he cannot see what is behind his current field of view on the right side of the bicycle, even using rear view mirrors.

Figure 2A:
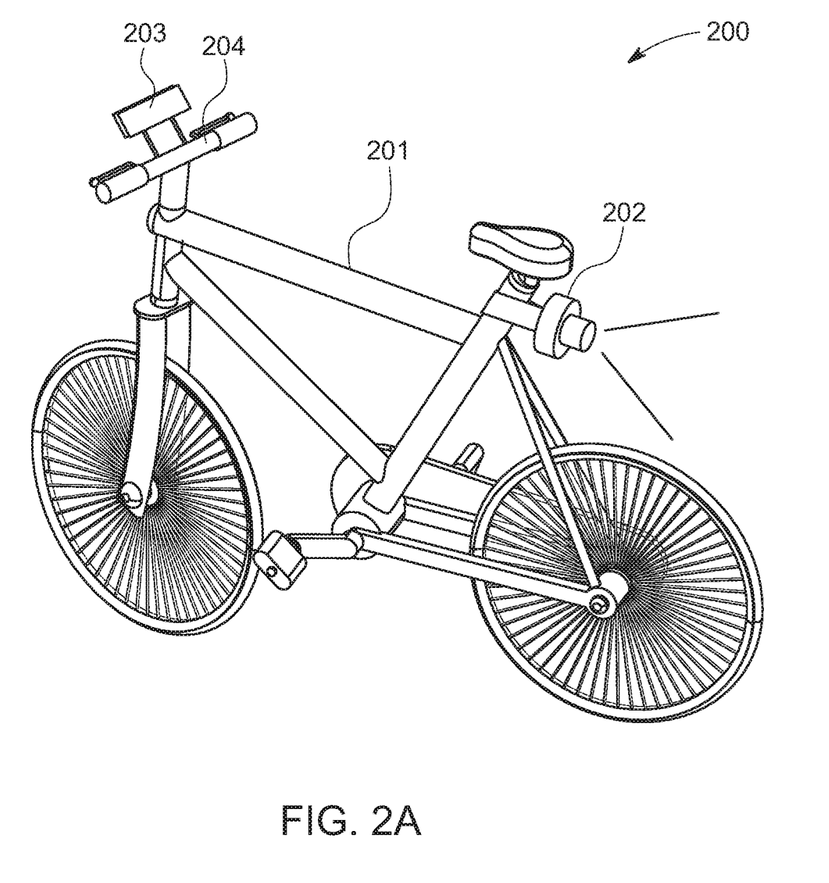
FIG. 2A shows an example bicycle equipped with a camera and a display suitable for the operating environment of FIG. 1.

FIG. 2A shows an example bicycle equipped with a camera and a display suitable for the operating environment of FIG. 1. The example bicycle 200 includes a frame 201, a handle 204 with a display device 203 attached, and a video camera 202 attached to a rear part of the bicycle 200.

A personal vehicle monitoring system may include the video camera 202 mounted on a base attached to the personal vehicle and controlled by a video camera controller, and a display device mounted at a point on the personal vehicle that is easy for a rider of the personal vehicle to monitor, controlled by a display controller. The video camera 202 is placed on the personal vehicle at a position that is not in direct field view of the rider of the personal vehicle. While riding a vehicle, the rider generally looks in the direction of the motion of the vehicle to avoid collision with other vehicles or objects. The rider may occasionally look to the sides or even rearwards, but the direct field of view is forward at majority of times. A rear view mirror may provide view of the surroundings, however, it has limited functionality in only showing images and does not include any automatic processing capacities such as alerts, emphasis, notifications, user input for setup, and the like. These additional functionalities are provided by the disclosed personal vehicle monitoring system.

In various embodiments, the video camera is automatically movable without direct user command or action by a video camera controller via a moving base to direct the video camera in various directions for a more comprehensive, and also a more focused and detailed view of the surroundings of the personal vehicle. The automatic movement of the video camera may be based on predefined conditions that once created cause the video camera to be moved to point to and show a particular direction by the video camera controller. In some embodiments, user input via the display controller may also cause the camera to point to a particular direction chosen by the rider.

In various embodiments, the user or rider riding the bicycle 200 may view the scenes and events behind the bicycle 200 captured by the video camera 202 on the display device 203. In various embodiment, the display device 203 may be a light emitting diode (LED) display, liquid crystal display (LCD), a smartphone screen, or other similar devices that can show images provided by a video camera. In some embodiments the display device 203 may include a backlit screen, a transflective thin film transistor (TFT) display, positive mode (dark letters on light background) display, an organic LED (OLED), or any other display technology or device that has sufficient resolution, visibility and contrast to be reliably viewed or read by human eye in bright daylight or sunlight.

In the case of using a smartphone as a display, a video display software application ("app") may be used to display the video output of the video camera 202 on the smartphone screen. A smartphone is a communication device that includes a computer processor, memory, input/output (I/O), transmitter and receiver, and other components often used in a computer. Smartphones are often pocket-sized computers that may have many functions performed under software control. The software may include an operating system and various apps designed for various functions such as a calculator, a camera, an internet browser, and the like. The smartphone may receive the video output of the video camera 202 via a wireless connection, such as Bluetooth or WiFi or other suitable wireless protocols, or via a wired connection. The video display app may read the video output from the video camera 202 in real-time and display it directly on the smartphone's screen. In such a configuration, other incoming data and other processing functions, such as phone calls, may continue to be provided by the smartphone while displaying the output of the video camera 202. In some embodiments, the video display software app may implement the display controller that reads user input, global positioning system (GPS) signals, perform various calculations and processing, and communicate with the video camera controller, as further described herein.

In various embodiments, the video camera 202 may be any of a variety of small portable video cameras that are used to record various scenes in bright to dim lighting conditions without the aid of artificial light. The output video encoding format for the video camera 202 may be any one of several common formats such as MP4, WMV, FLV, AVI, and the like.

In some embodiments, the video camera 202 may be mounted on a base that compensates for mechanical vibrations, such as a gyroscopic base (by which a set direction remains fixed regardless of the motions of the bike, such as up and down or side to side movements or vibrations, a damped suspension, or a supple and soft synthetic plastic or natural rubber that cushions vibrations to allow recording of scenes by the video camera 202 with negligible distortions in the resulting visual output or recording of the video camera 202. Such video camera base reduces movements of the camera lens to a level that allows the camera to obtain a scene focus and sufficient light integration by the image sensor of the video camera 202 to avoid motion blurriness.

Figure 2B:
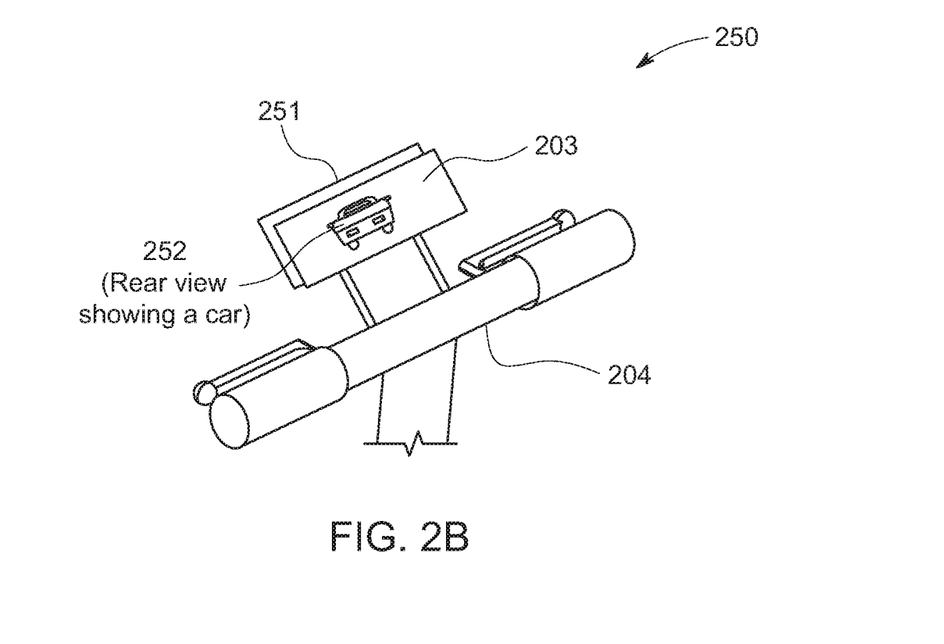
FIG. 2B shows an example bicycle front-end of the bicycle of FIG. 2A with a display device mounted thereon.

FIG. 2B shows an example bicycle front-end of the bicycle of FIG. 2A with a display unit mounted thereon. In some embodiments, the bicycle front-end 250 includes display device 203 mounted on bicycle handlebar 204, display controller 251 coupled with display device 203 and displaying rear-view or side-view images 252 acquired by the video camera 202.

In various embodiments, as noted above, the display device 203 may include a backlit screen, a TFT display, a positive mode display, an OLED screen, or any other display technology or device that has sufficient resolution, visibility and contrast to be reliably viewed or read by human eye in dim light conditions at evenings or night and bright daylight or sunlight. The display device 203 may also be touch-sensitive to take user input from the screen rather than from a keyboard or mouse, which are generally not available while riding a bicycle. Other technologies, such as retinal or eye tracking may also be used to take user/rider input selection on the screen. Eye tracking software uses a camera to track user's eye focus and select an icon or active display element the user is looking at the same way the user may click on such element with a mouse.

In various embodiments, the display device 203 may have various display areas for showing status information and provide control interface for the rider. For example, the display device may have a designated area, such as a strip at top or bottom or the sides of the screen for showing status information such as a blinking light, speed of the bicycle, angle of ascent or descent of the road, battery status, and the like. It may also have designated areas for control by the user to select display and camera settings, modes, display options, and the like.

In various embodiments, the display controller 251 may be electrically, wirelessly, and/or mechanically coupled with the display device 203 to control what is displayed and how it is displayed. The display controller may have a Von Neuman computer architecture, like most personal computers (PC) with a stored-instruction design. In this architecture, a central processing unit (CPU) fetches instructions stored in a computer memory and executes the instructions to perform various functions such as calculations, data movements, input/output (I/O) functions like reading user input from a computer and displaying results on the screen. The display controller 251 may further include a storage device such as a small hard disk drive or an SSD to store programs that are loaded into memory for execution upon controller system power-up or user command. The display controller 251 may also include network interface circuits, transmitter and receiver for wireless communications, and data bus and control bus connecting various functional modules.

The display controller 251 may include display algorithms stored in firmware or loaded from storage executed by the CPU to display signals to the rider at the appropriate time, such as displaying a blinking red light to indicate caution or danger. Such display algorithms may also process and manipulate the video camera 202 images to show them from a different angle to the user based on various conditions further discussed below.

In various embodiments, the display controller 251 may control other apparatus and circuits than the display device 203. For example, the display controller 251 may control some of the settings of the video camera 202, such as a mode of operation, frame rate, color or black and white recording, various light or image filters, and the like. The data connection between the display controller 251 and video camera 202 may be wired or wireless using various communication protocols such as universal serial bus (USB), other serial interface, Bluetooth, and the like.

Figure 2C:
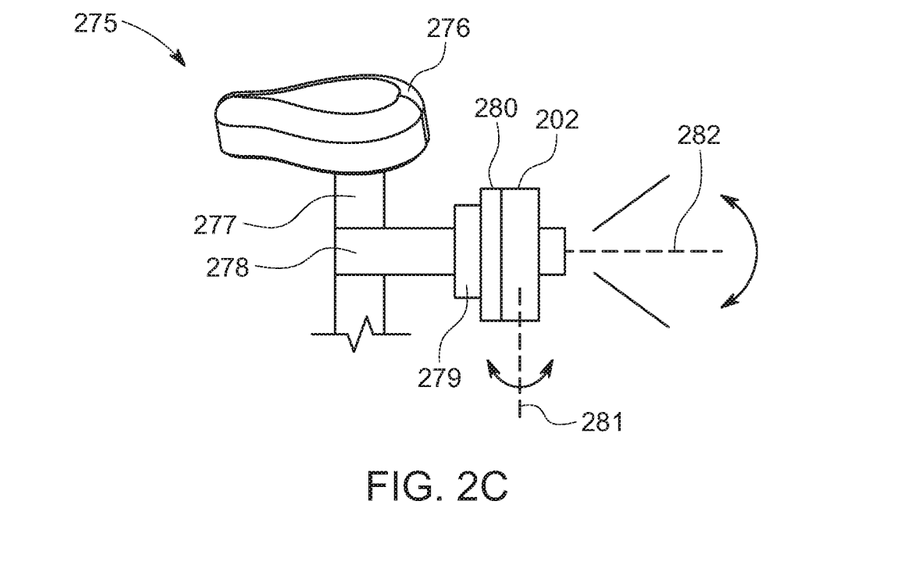
FIG. 2C shows an example bicycle seat post of the bicycle of FIG. 2A with a camera mounted thereon.

FIG. 2C shows an example bicycle seat post of the bicycle of FIG. 2A with a camera mounted thereon. In various embodiments, the bicycle back end 275 includes a bicycle post 277 supporting a seat 276 and a camera mount 278. The video camera 202 may be coupled with a video camera controller 280, which in turn may be mounted on a articulating base 279 to rotate the video camera about two axes 281 and 282 to point to various directions.

In various embodiments, as noted above, the video camera 202 may be a small portable camera such as GoPro™ or other similar devices. The output video encoding format for the video camera 202 may be any one of several common formats such as MP4, WMV, FLV, AVI, and the like.

In various embodiments, the video camera controller 280 may be a general purpose microcontroller with components similar to those of the display controller 251. In other embodiments, the video camera controller 280 may be a hardware circuit that receives predefined hardware signals to control the operation of the video camera 202, including focus, aperture and/or exposure adjustment, zooming in and out, image filtering for noise, and other image processing. In some embodiments, the video camera controller 280 may also control the operation and movement of the articulating base 279 to direct the video camera 202 to a specific direction side-ways, up and down, or a combination to point in any angle in the 3-D reference frame.

With the video camera being pointed in any direction desired to capture scenes in the chosen direction, the user or rider can see objects, such as approaching traffic, in any direction behind the bicycle. In other embodiments, a wide-angle lens or fish-eye lens may be used to view a wide field behind the bicycle. There is a tradeoff between using a wide-angle lens and a narrower-field lens in that the wide-angle lens does not show as much detail on the same size display screen as a narrower-angle lens because a greater field of view has to be fit within the same area, hence showing less detail and smaller object. As such, the rider riding bicycle 200 may not notice another vehicle, such as a motorcycle or another bicycle, which looks smaller on the display device 203, approaching from the side and behind the rider's bicycle.

In various embodiments, the articulating base 279 may be a motorized mechanical device that rotates about two perpendicular axis 281 and 282 as shown in FIG. 2C. Rotation about each axis 281 and 282 may be controlled by an independent electric motor under the command of a controller such as the video camera controller 280 or the display controller 251. The combination of the two angles about each of the two axis 281 and 282 can create any angle in a 3-D reference frame. The 3-D angle may be generated automatically by the controllers based on predefined criteria and conditions, or manually on rider's command via an interface on the touch-sensitive display device 203.

Figure 3A:
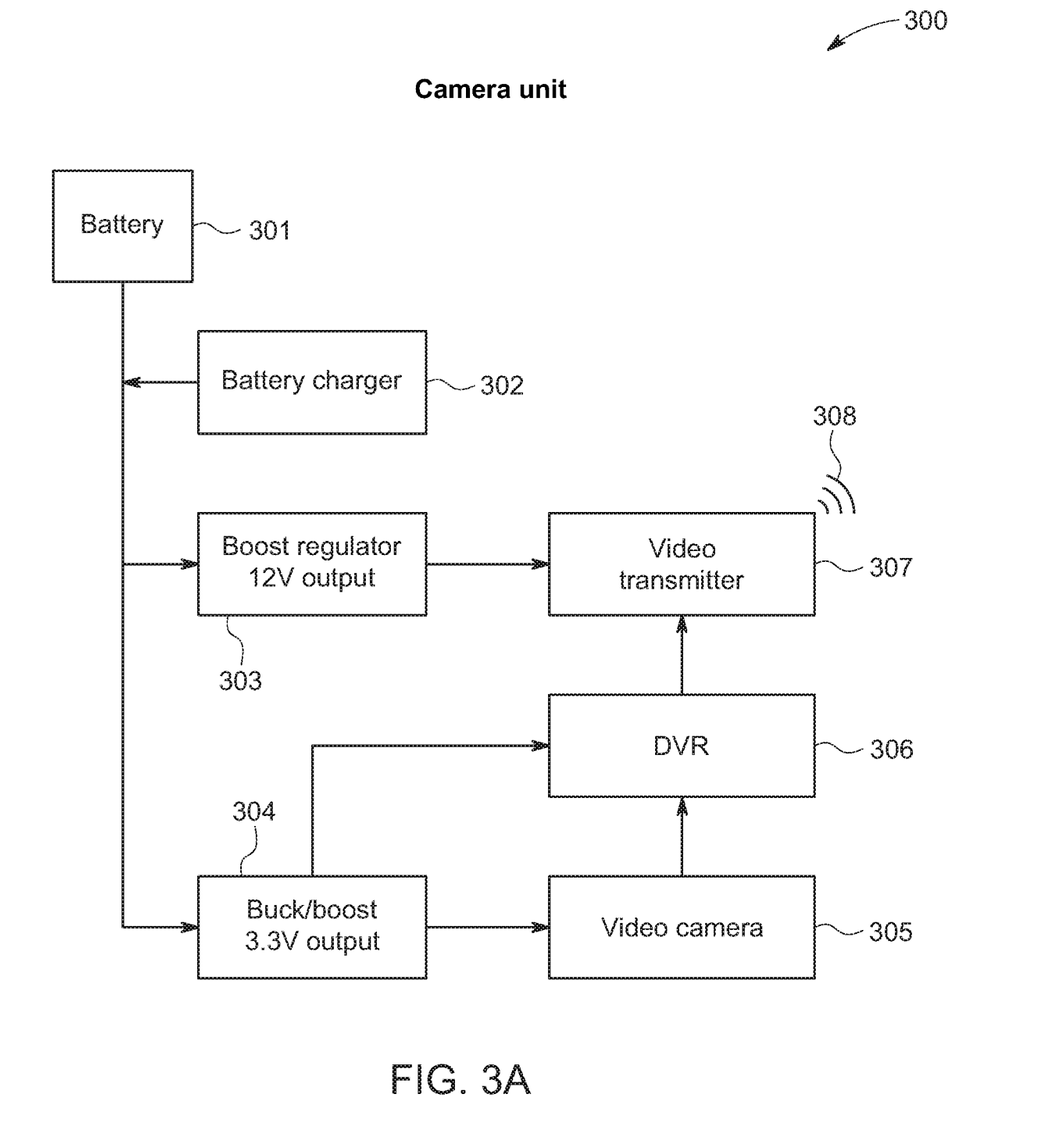
FIG. 3A shows an example camera controller to control an operation of the camera of FIG. 2C.

FIG. 3A shows an example camera controller to control an operation of the camera of FIG. 2C. In various embodiment a camera unit 300 includes a power source 301, a charger 302, a voltage boost regulator 303, a buck-boost voltage regulator 304, a camera 305 (similar to video camera 202 of FIG. 2A), a digital video recorder (DVR) 306, and a video transmitter 307 transmitting wireless data 308.

In various embodiments, the camera unit 300 is a combination of video camera 202 and video camera controller 280 of FIG. 2C, integrated together. In other embodiments, the components shown in FIG. 3A, excluding camera 305, constitute the video camera controller 280 that may work with the camera 305 as separate and distinct modules. In some embodiments, the camera unit 300 may include a control module in addition to those shown in FIG. 2C that may communicate with the display controller 251 to obtain user input for setting up the camera parameters and operational mode, and also to control the articulating base 279 on user command or other predefined conditions.

In some embodiments, the camera control unit 300 or the camera controller 280 may include a motion sensor or a motion detector that when pointed to a moving object, such as a vehicle, determines the speed and/or the distance (to the bicycle) of the moving object and transmits it to a controller, such as the video camera controller 280 or the display controller 251. Motion sensors may include devices using the Doppler effect, such as laser guns or light detection and ranging (LIDAR) devices. In other embodiments, the video camera controller 280 and/or the display controller 251 may include image recognition and processing software that recognize or determine an approaching vehicle's contours, for example, by using feature extraction or edge following algorithms, and calculates or estimates the rate of approach of the vehicle and its distance to the personal vehicle. These calculations may be based on the rate of change of apparent size (size of detected image) of the approaching vehicle. In still other embodiments, GPS data, along with other sensory information, may be used to determine or estimate the distance and speed of the approaching vehicle.

In various embodiments, the power source 301 may be a fixed-power battery supplying DC current to the video camera controller 251. In other embodiments, the power source 301 may take other forms such as a rechargeable battery, a small fuel cell or a photovoltaic cell, depending on power consumption rate of the controller and camera.

In some embodiments, the charger 302 may be a fast battery charger used to quickly charge the rechargeable battery 301.

In some embodiments, the boost regulator is a DC-to-DC converter that may be used to boost the battery voltage output to a higher level. For example, a 6 volt battery output may be boosted to 12 volts by various electrical methods, such as charge pumps, to allow the operation of various components of the video camera controller 251 and video camera 202 (or camera 305) that use higher or lower voltages than provided by the power source 301.

In some embodiments, the buck/boost regulator is a DC-to-DC converter that may be used to reduce (buck) or increase (boost) the battery voltage output to a lower or higher level, respectively. For example, a 6 volt battery output may be boosted to 12 volts or reduced to 3.3 volts by various electrical methods, such as using a combination of capacitors and inductors, to allow the operation of various components of the camera 305, DVR 306, and video transmitter 307 that use higher or lower voltages than provided by the power source 301.

In various embodiments, the DVR 306 may be a storage based on a small or micro magnetic disk (hard drive) or SSD to store the video output of the video camera 202 for later download to a permanent computer storage or for review in case of a event of interest such as an accident. In some embodiments, the DVR may be used for storing all video output automatically as a matter of standard operation, while in other embodiments, the DVR may be activated on user command or based on predefined criteria.

In some embodiments, the video transmitter 307 receives the output of the camera 305 and wirelessly transmits it to the display controller 251 to display the video on the display device 203. In some embodiments, a receiver may be combined with the transmitter to create a transceiver for both transmitting and receiving wireless data. The received wireless data may be user commands or other signals and data from the display controller 251.

Figure 3B:
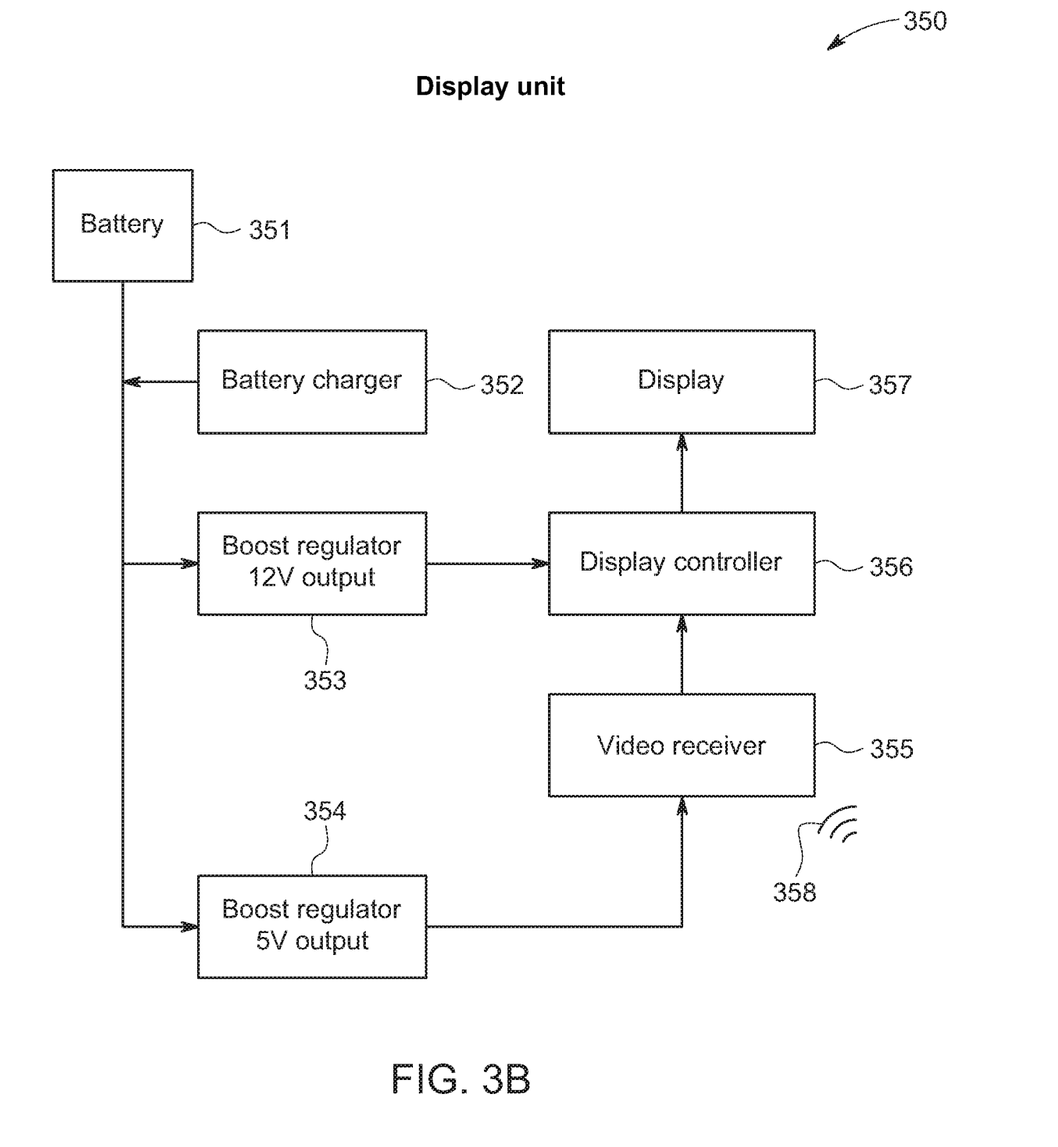
FIG. 3B shows an example display unit to control an operation of the display device of FIG. 2B.

FIG. 3B shows an example display controller to control an operation of the display device of FIG. 2B. In various embodiment a display unit 350 includes a power source 351, a charger 352, a voltage boost regulator 353, a buck-boost voltage regulator 354, a display device 357 (similar to the display device 203 of FIG. 2A), a display controller 356 (similar to display controller 251 of FIG. 2B), and a video receiver 355 to receive wireless data 358.

In various embodiments, the display unit 350 is a combination of display device 357 and display controller 356, integrated together. In other embodiments, the components shown in FIG. 3B, excluding display device 357, are the supporting components for the display controller 356, which works together with the display device 357 as separate and distinct modules.

In some embodiments, the display controller 356 may include GPS module including circuits and receiver to receive GPS data. GPS data may be used to locate the current position of the bicycle within a geographic map, such as a city map. The GPS data may also be used to plan a route for riding by entering a destination or a route identifier. The route may be displayed on the display screen 203 while riding to guide the rider, in a similar manner a car GPS is used.

In some embodiments, the display controller 356 may further include a driving computer module to show driving parameters such as speed, average speed, direction, fuel efficiency (for example, gas-mileage that is applicable to motorized vehicles such as motorcycles), distance covered, time since the ride started, time spent on a particular trip, and the like.

In some embodiments, the display controller 356 may include a motion detection module to interact with a motion sensor deployed within the video camera 202 or as a separate sensing unit. When the motion sensor is pointed to a moving object, such as a car, it determines its speed and distance and provides the data to the camera controller 280 to transmit it to the display controller 356, or alternatively, directly transmits the data to the motion detection module of the display controller 356.

In various embodiments, the power source 351 may be a fixed-power battery supplying DC current to the display controller 356 and other supporting components shown. In other embodiments, the power source 351 may take other forms such as a rechargeable battery, a small fuel cell or a photovoltaic cell, depending on power consumption rate of the controller and camera.

In some embodiments, the charger 352 may be a fast battery charger used to quickly charge the rechargeable battery 351.

In some embodiments, the boost regulator is a DC-to-DC converter that may be used to boost the battery voltage output to a higher level. For example, a 6 volt battery output may be boosted to 12 volts by various electrical methods, such as charge pumps, to allow the operation of various components of the display unit 350 including display device 357 (or display device 203) that use higher or lower voltages than provided by the power source 351.

In some embodiments, the buck/boost regulator is a DC-to-DC converter that may be used to reduce (buck) or increase (boost) the battery voltage output to a higher level. For example, a 6 volt battery output may be boosted to 12 volts or reduced to 5 volts by various electrical methods, such as using a combination of capacitors and inductors, to allow the operation of various components including the video receiver 355, display controller 356, and display screen 357 that use higher or lower voltages than provided by the power source 351.

In various embodiments, the video receiver 355 receives wireless data obtained from the video camera 202 and transmitted by the video transmitter 307. The video receiver 355 may filter for noise reduction, condition, amplify, or otherwise process the received data signals to prepare the data for passing on to the display controller. The data received via wireless protocols such as WiFi and Bluetooth are generally in serial form, transmitted one bit at a time. In some embodiments, the receiver may receive the serial bit-stream and then deserialize the bits and pack them into bytes (for example, 8-bit packets) or words (for example, 16-, 32-, or 64-bit packets) before sending the data to the display controller 356. In other embodiments, the bit-stream received by the receiver 355 may be filtered for noise and amplified to the appropriate voltage level before sending it in serial form to the display controller 356 for further processing and use, including deserialization.

In various embodiments, the display controller 356 receives the video data generated by the video camera 202 and transmitted to the display controller 356 via receiver 355 and place the data on the appropriate part of the display screen 357 designated for image display. The display controller may further display status data and control icons (such as buttons, picklists, sliders, etc.) on other pre-designated areas of the display screen 357. In some embodiments, the display controller 356 is for writing data and not for reading user input, while in other embodiments, the display controller 356 is for both showing data and reading user input via a touch-sensitive display screen. Other methods of user input, such as hardware buttons may also be used in some embodiments.

In some embodiments, the display controller 356 may include an interface to the video camera controller 280 to send user commands or predefined commands based on predefined conditions. The predefined conditions may include time of day, light level, slope of the road (uphill or downhill), street or location on which the bicycle is currently moving, traffic conditions, and the like. Such predefined conditions may trigger predefined commands such as adjusting the angle of the camera or its mode of operation.

In various embodiments, the display screen 357 may be a touch-sensitive screen that allows user input via graphic control elements or input elements that are selected by the user. The display controller 356 may read such graphic control or input elements and issue a corresponding command to the video camera controller 280 to alter the operation of the video camera 202.

Figure 4:
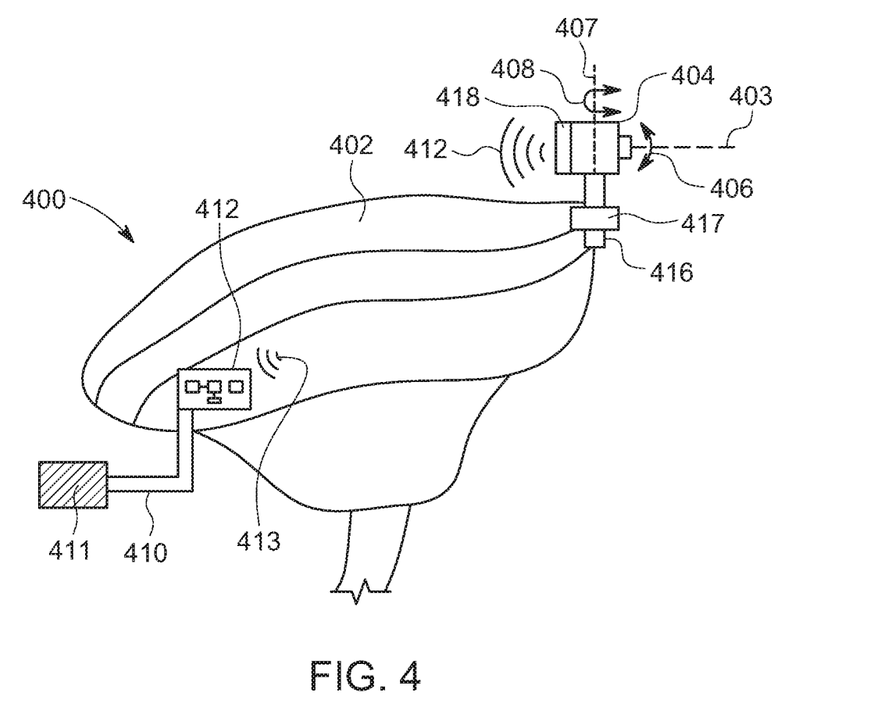
FIG. 4 shows an example bicycle helmet having a movable camera with adjustable viewing angle and a display usable when riding the bicycle of FIG. 2A.

FIG. 4 shows an example bicycle helmet having a movable camera with adjustable viewing angle and a display usable when riding the bicycle of FIG. 2A. In various embodiments, a helmet configuration 400 may include a helmet 402, a video camera 404, a video camera controller 418, a horizontal axis of rotation 403 with a direction of rotation 406, a vertical axis of rotation 407 with a direction of rotation 408, wireless signal 412, a camera support 416, a camera base 417, a display support 410, a display screen 411, and a display controller 412.

In various embodiments, the helmet may be any suitable head gear to protect the rider's head in case of a fall or accident. The helmet may be different depending on the type of personal vehicle being used. For example, the helmet for a bicycle may be light weight and made of protective foam, while the helmet for a motor cycle may be heavier and more protective due to the greater speeds achievable by motorcycles. Regardless of the type of personal vehicle, the protective head gear may be made or retrofitted to include the components mentioned above and described below.

In various embodiments, the video camera 404 may be any small video camera that may be used for taking video during motion that can provide image resolution, clarity, contrast, and light that is sufficient for identifying vehicles and alphanumeric characters, such as license plate numbers or car model names. Such video cameras may be similar to those described with respect to FIGS. 2A, 2C, and 3A. The video camera 404 is embedded substantially in rear section of the helmet 402 facing towards the back of the rider and providing a viewing field 180° away from the center of the rider's field of view. In other embodiments, the video camera 404 is placed on the side or top of the helmet 402. In various embodiments, the video camera 404 is internally embedded in the helmet 402, while in other embodiments the video camera 404 is externally installed, for example, using a small attachment frame. In some embodiments, the video camera 404 is built into the helmet 402 at manufacture time, while in other embodiments, it may be installed onto the helmet as an after-market accessory.

In some embodiments, video camera 404 and/or display screen 411, along with both the video camera controller 418 and display controller 412, are powered by a battery pack embedded in the helmet, while in other embodiments, the camera and display may be powered by a battery pack attached to the rider's clothing or to the bicycle. In still other embodiments, the camera and display may be powered by a small electrical generator coupled with the bicycles' wheels to produce a small amount of electricity while the wheels are moving.

In various embodiments, the video camera 404 is mounted on a gyroscopic base to maintain the camera's orientation or geographic direction (such as compass North, South, etc.) while the rider turns his head away from the road behind him, ensuring the camera still substantially shows the road on the display. In some embodiments, the gyroscopic base may be disabled to allow the camera to show what it is directed towards as determined by the rider's direction of view, rather than maintaining a fixed direction. In some embodiments, the gyroscopic base may be disabled or enabled dynamically. In various embodiments, the gyroscopic base may be disabled by decoupling it from the camera.

In various embodiments, the video camera controller 418 is similar in structure and function to the video camera controller 280 of FIG. 2C and video camera controller described with respect to FIG. 3A.

In various embodiments, the wireless signals 412 and 413 are signals generated and received by both the video camera controller 418 and display controller 412 in one-way or two-way communications described with respect to FIGS. 3A and 3B.

In various embodiments, the camera support 416 is a structure that is coupled to the video camera 404 and physically supports it in attaching to the camera base 417.

In various embodiments, the camera base 417 may have a structure to allow it to change the camera angles 406 and 408 about axis 403 and 407 respectively. Such support structure may include small motorized components that rotate in the planes perpendicular to the axis 403 and 407 to direct the video camera 404 in various directions.

In various embodiments, the display support 410 may be a simple structure, such as a simple pivoting L-shaped handle inserted in the helmet 402 to move the display screen 411 in front of user's eye and away from it when not wanted. It may also be a segmented friction arm that stays at the point in 3-D space at which it is positioned. Other similar devices and methods may be employed to position the display screen 411 at a proper position before the rider's eye.

In various embodiments, the display screen 411 may be a small and light screen for displaying the images generated or collected by the video camera 404 and transmitted to the display controller 412. Various types of display were described with respect to FIGS. 2B and 3B may be equally applicable to this embodiment. In various embodiments, the display screen 411 may or may not exist as an integral part of the helmet. In some embodiments, the display screen is detachable, while in other embodiments, it is permanently fixed.

In various embodiments, the display controller 412 is similar in structure and function to the display controller 251 of FIG. 2B and display controller 356 of FIG. 3B.

Figure 5:
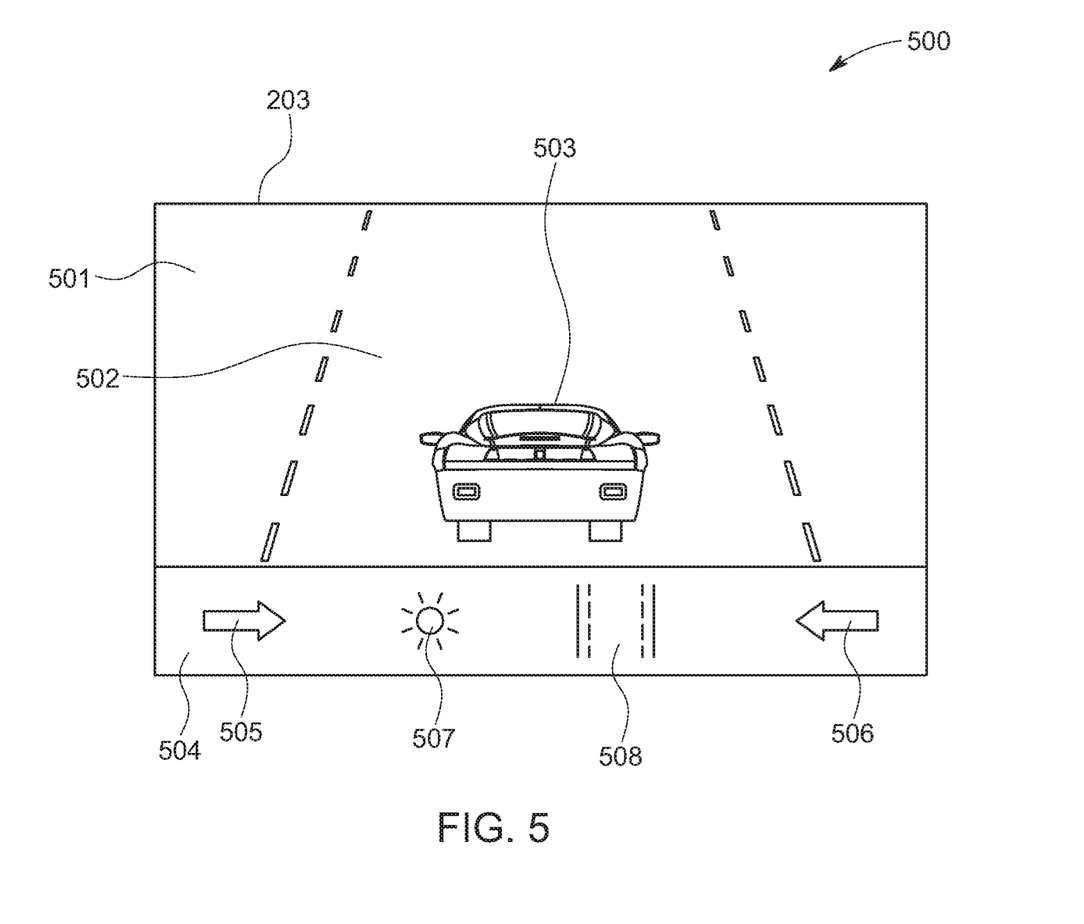
FIG. 5 shows an example display device showing a rear view of the bicycle of FIG. 2A and status indicators.

FIG. 5 shows an example display device showing a rear view of the bicycle of FIG. 2A and status indicators. In various embodiments, display screen arrangement 500 includes a display device 203, an image display area 501, a street or road image 502, a scene image 503, a status and control area 504, left direction indicator 505, right direction indicator 506, blinking indicator 507, and alignment indicator 508.

In various embodiments, display device 203 may be used to communicate with the rider of the bicycle 200, both to show images and status and to get user's or rider's inputs and commands. The display device 203 may be divided into various display segments or display areas, each area being designated for a particular type of information such as image, status, and command. In some embodiments, the display areas may be combined in some combination. For example, the status and command display areas may be combined in one status/command area. In other embodiments, all display areas may be over-laid. In this embodiment, status and command may be context-sensitive and appear on user touch, or based on other conditions, such as when there is an event of which the rider is notified, like a fast approaching vehicle.

In various embodiments, the image display area 501 may be a display segment in which the image acquired by the video camera 202 obtains and transmits to the display controller 251 is displayed (see FIG. 2B). The image for a bicycle rider may be real-time video data of a roadway image 503 behind the bicycle (opposite the direction of motion of the bicycle) or other images in the surrounding areas in which direction the video camera 202 is pointed. The image display area generally shows the driver, in real-time, what is outside his direct field of view. The image area 502 shows information to the rider that may be needed to avoid an accident and to generally have a view of most of the rider's surroundings in addition to his direct filed of view.

In various embodiments, status and control area 504 may be a designated area for showing general status of the ride to the rider and also present an interface to the rider to collect the rider's inputs and commands. The status information shown in the status and command area may include left and right arrows 505 and 506, respectively, that may indicate an event of interest occurring on the left side or the right side of the driver. For example, if a vehicle is approaching the current position of the bicycle from the left (or right) side on the rear side of the bicycle, the left (or right) arrow may start blinking. In some embodiments, the arrow may blink faster to indicate a relatively higher speed of the vehicle approaching. Alternatively, the left arrow may change color from green to yellow to red in a gradual and continuous transition between the colors based on the relative speed of the approaching vehicle, with green indicating no approaching vehicle and red indicating a fast approaching vehicle. Still another method of indication of an approaching vehicle is to change the size (making it bigger) of the left and right arrows 505 and 506, respectively. Yet another method is to use mechanical vibrations or sound to get the attention of the rider. Various frequencies of vibration or sound may be used to signify particular events and various intensities of vibration and sound may be used to signify urgency or significance. In some embodiments, several methods of indication, such as blinking and change of color, may be combined to increase the notification effect and get the attention of the rider more quickly.

In some embodiments, the blinking indicator 507 may indicate other conditions or approaching events. For example, the blinking indicator 507, in collaboration with the GPS-based route map, may indicate the bicycle is approaching a busier intersection or street and the rider may need to be more cautious. It may also be used to indicate a vehicle, such as a car, is approaching directly from behind the bicycle (not from left or right). The blinking indicator may also use various modes or methods of indication such as the speed of blinking, the color of the indicator, or the size of the indicator.

In some embodiments, a traffic lane alignment indicator 508 may be used to indicate whether the bicycle 200 moving at the edge of a road image 502, showing a traffic lane, for example, is close to transition to the adjacent lane or it is keeping within its own lane. In some instances, the bicycle 200 may be moving in a designated bicycle lane. In such instances, the alignment indicator 508 may help the rider stay within the bicycle lane and avoid adjacent car lanes which are more dangerous. In some embodiments, the alignment indicator 508 may include two parallel solid lines on the outside and two parallel dotted lines on the inside, as shown. The solid lines indicate the boundaries of adjacent lanes, while the dotted lines indicate a safe margin away from the boundaries. This indicator allows the rider to stay in his own lane without drifting into adjacent lanes. In some embodiments, if the GPS data or other sensor data indicate that the bicycle is moving close to the boundary lines or has crossed them, the alignment indicator may flash or otherwise notify the rider.

In various embodiments, the status and control area 504 may present picklists, buttons, sliders, and other user input elements for the rider to issue commands for altering the setup or operation of the video camera 202 or the display device 203. For example, the rider may select an angle or direction from a picklist for the video camera direction. When the display controller 251 reads the input provided by the rider, it issues a command to the camera controller 280 to change the direction the video camera is scanning. As another example, the user may alter the settings of the display such as changing the zoom setting for a bigger more detailed image (zoom-in) or for showing a wider less detailed area (zoom-out).

Figure 6:
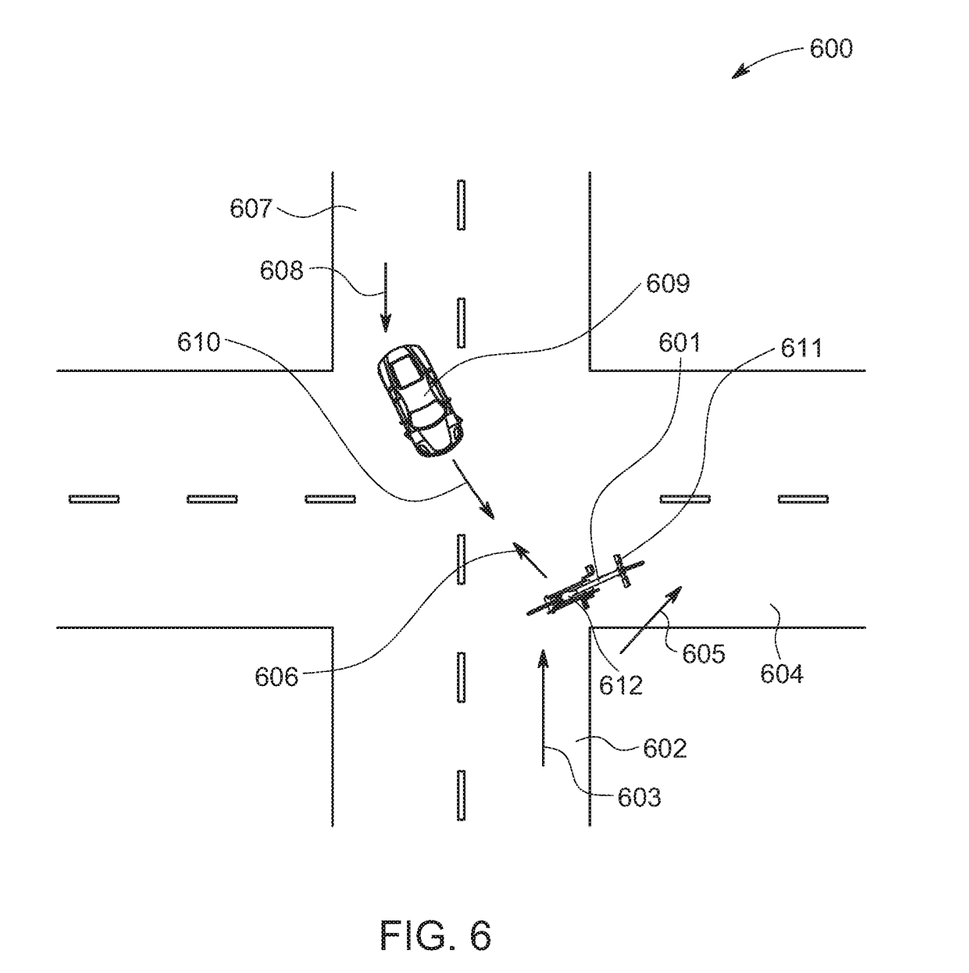
FIG. 6 shows an example operation of the bicycle of FIG. 2A while turning.

FIG. 6 shows an example operation of the bicycle of FIG. 2A while turning. The example bicycle use-case or operation 600 shows a bicycle with frame 601 on a street or roadway 602 stretched along a direction 603 crossing another street 604. The bicycle is shown with frame 601 coupled with a handlebar 611 and a seat 612 turning from direction 603 in direction 605 onto street 604. A vehicle 609 coming from direction 608 a street 607 is turning onto the street 604 along direction 610. A video camera mounted on the bicycle frame 601 is directed in a direction 606 approximately opposite the direction 610.

In various embodiments, when the bicycle starts turning, the display controller 251 (see FIG. 2B) detects the direction and magnitude of the turn of the bicycle and sends a command to the camera controller 280 (see FIG. 2C) to change the direction of the camera based on the direction of the bicycle's turn. More specifically, when the bicycle is moving in a straight line, the handlebar 611 is perpendicular (90 degree angle) to the bicycle frame 601 when both front and back wheels are aligned with the bicycle frame 601. But when the bicycle turns, the angle between the handlebar 611 and the frame changes from 90 degrees. The angle on the outside of the turn curvature is increased from 90 degrees, while the angle on the inside of the turn curvature is decreased from 90 degrees by the same amount.

During a turn, the angle of the video camera 202 (see FIG. 2C) is changed in the same direction and by the same amount as the handlebar 611 on the outside of the turn curvature. So, if the bicycle is turning clockwise, as shown in the figure, the video camera 202 is also turned clockwise by the same angle, when the video camera 202 was pointing directly opposite the direction of the motion of the bicycle before the turn started. If the angle of the handlebar 611 changes more, the angle of the camera is adjusted by the same amount in the appropriate direction, as described above. Similarly, if the bicycle turns counterclockwise, the video camera 202 will also be turned counterclockwise by the same amount.

With this operation of the video camera based on the tuning of the bicycle, the rider can view any vehicle 609 coming towards the bicycle from its side while turning. When the bicycle starts moving in the new direction in a straight line again, for example, when on street 604, the video camera 202 is returned to its original direction, which is normally directly opposite the direction of the motion of the bicycle.

In various embodiments, the direction of the bicycle turning may be determined from GPS data or using a sensor on the front wheel turn axle (vertical axle coupling handlebar 211 to the front wheel for turning) that indicates the direction of turn and the change of angle in that direction. The display controller 251 may have a separate module, in hardware, software of a combination of both, that determines the angle of turn and issues the appropriate command to the video camera controller 280.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A personal vehicle monitoring system comprising:
a video camera coupled with a personal vehicle to show a view not in a direct field of view of a rider of the personal vehicle;
a display unit coupled with the personal vehicle and in communication with the video camera to display images captured by the video camera, wherein the display unit includes circuits and software to indicate an event including other vehicles approaching the personal vehicle; and wherein
a direction of the video camera, with respect to the personal vehicle, is altered by turning the video camera in a same clockwise or counterclockwise direction and a same angle magnitude as a clockwise or counterclockwise direction and angle magnitude, respectively, of a turn by the personal vehicle, to show a scene substantially behind the personal vehicle and in a direction opposite a direction of a motion of the personal vehicle.

2. The personal vehicle monitoring system of claim 1, further comprising an articulating base for the video camera.

3. The personal vehicle monitoring system of claim 2, further comprising a video camera controller to control settings and direction of the video camera.

4. The personal vehicle monitoring system of claim 3, wherein the display unit includes a display device and a display controller coupled together, the display controller to control the display device.

5. The personal vehicle monitoring system of claim 4, wherein the display device is touch sensitive to receive user input.

6. The personal vehicle monitoring system of claim 4, wherein the video camera controller is coupled with the display controller via a wireless communication protocol.

7. The personal vehicle monitoring system of claim 6, wherein the wireless communication protocol is Bluetooth protocol.

8. The personal vehicle monitoring system of claim 4, wherein the display device has a screen that is divided into an image display segment and a status and command segment.

9. The personal vehicle monitoring system of claim 8, wherein the status and command segment includes a left arrow to indicate an event on the left side of the personal vehicle, a right arrow to indicate an event on the right side of the personal vehicle, and a traffic lane alignment guide to maintain the personal vehicle within a traffic lane.

10. A method of viewing a roadway by a rider of a personal vehicle, the method comprising:
  Capturing images not directly in a field of view of the rider of the personal vehicle using a video camera coupled with the personal vehicle;
  viewing the images captured by the video camera on a display unit coupled with the personal vehicle and in view of the rider, wherein the display unit includes circuits and software to indicate an event including other vehicles approaching the personal vehicle; and
  altering a direction of the video camera, with respect to the personal vehicle, by turning the video camera in a same clockwise or counterclockwise direction and a same angle magnitude as a clockwise or counterclockwise direction and angle magnitude, respectively, of a turn by the personal vehicle, to show a scene substantially behind the personal vehicle and in a direction opposite a direction of a motion of the personal vehicle.

11. The method of claim 10, further comprising controlling settings of the video camera using a video camera controller.

12. The method of claim 11, wherein the display unit comprises a display device and a display controller.

13. The method of claim 12, wherein the display device is divided into an image display segment and a status and command segment.

14. The method of claim 13, wherein the display controller is wirelessly in communication with the video camera controller.

15. The method of claim 14, wherein the command and status segment on the display device is used to present indicators of events including approaching vehicles, wherein the indicators notify the rider by one or more of flashing, changing color, changing size, causing mechanical vibration, and causing a sound to be emitted.

16. A display unit of a personal vehicle monitoring system, the display unit comprising:
  a display device to show images to a rider of a personal vehicle;
  a display controller communicatively coupled with the display device to present information to the rider and collect input from the rider via the display device, wherein the display device includes a command and status segment that shows status of a surrounding of the personal vehicle via indicators, the status including a speed of approach of another vehicle and the direction of approach; and
  a video camera in communication with the display device, wherein a direction of the video camera, with respect to the personal vehicle, is altered by turning the video camera in a same clockwise or counterclockwise direction and a same angle magnitude as a clockwise or counterclockwise direction and angle magnitude, respectively, of a turn by the personal vehicle, to show a scene substantially behind the personal vehicle and in a direction opposite a direction of a motion of the personal vehicle.

17. The display unit of claim 16, further comprising a global positioning system (GPS) module to receive GPS data to display a planned bicycle route on the display device.

18. The display unit of claim 16, wherein the display unit includes wireless transceiver to communicate with the video camera controller.

19. The display unit of claim 18, wherein the video camera controller detects an approaching vehicle using one of a motion detector and an image processing algorithm to determine a speed and direction of approach of the other vehicle.

20. The display unit of claim 16, wherein the display device is a smartphone with a software application that implements the display controller.

* * * * *

UNITED STATES PATENT AND TRADEMARK OFFICE
CERTIFICATE OF CORRECTION

| | | |
|---|---|---|
| PATENT NO. | : 11,198,399 B2 | Page 1 of 1 |
| APPLICATION NO. | : 16/583083 | |
| DATED | : November 23, 2021 | |
| INVENTOR(S) | : Jeffrey L Gindin | |

It is certified that error appears in the above-identified patent and that said Letters Patent is hereby corrected as shown below:

On the Title Page

Item (71) and item (72) address:
-Bellevue, Wa.-
Should be changed to:
51059 Goldater Ct.; Indio, CA 92201

Signed and Sealed this
Twenty-fourth Day of September, 2024

Katherine Kelly Vidal
*Director of the United States Patent and Trademark Office*